T. J. BALMER.
EMERGENCY TRUCK.
APPLICATION FILED FEB. 23, 1915.
1,152,265.
Patented Aug. 31, 1915.
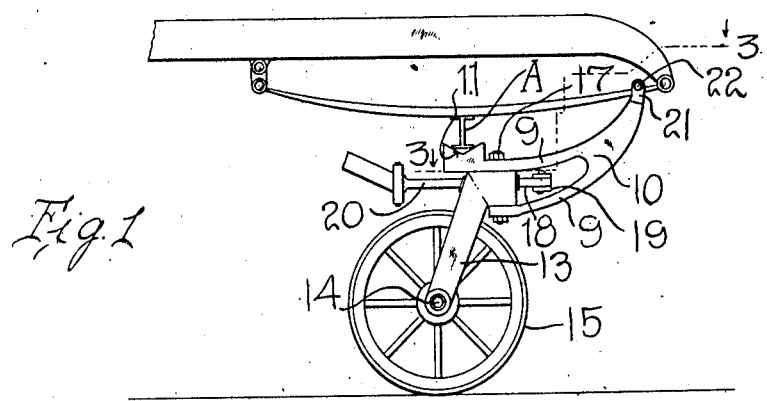
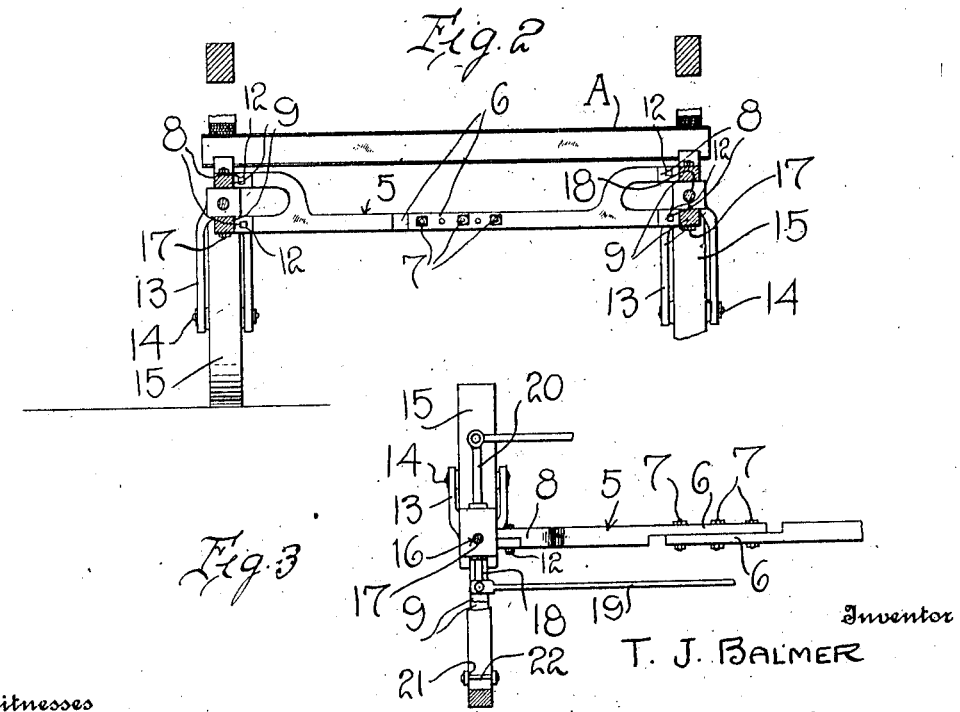
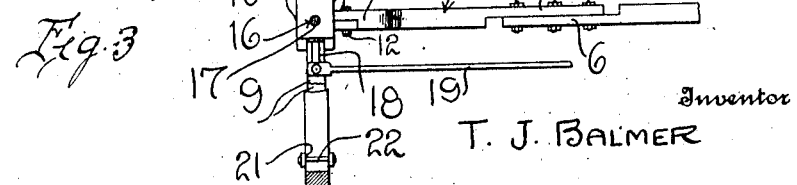

UNITED STATES PATENT OFFICE.

THOMAS J. BALMER, OF BOONE, IOWA.

EMERGENCY-TRUCK.

1,152,265.  Specification of Letters Patent.  Patented Aug. 31, 1915.

Application filed February 23, 1915. Serial No. 10,033.

*To all whom it may concern:*

Be it known that I, THOMAS J. BALMER, a citizen of the United States, residing at Boone, in the county of Boone and State of Iowa, have invented certain new and useful Improvements in Emergency-Trucks, of which the following is a specification, reference being had to the accompanying drawing.

This invention relates to emergency trucks for automobiles, and has for its primary object to provide a device of this character which may be easily and quickly adjusted and arranged in position for use when, for any reason, the wheels or axles with which the machine is provided, are incapable of properly supporting the machine body.

It is another object of my invention to provide an emergency truck of the above character consisting of relatively adjustable wheel carrying sections, each of said sections having a pivoted vertically movable wheel bearing yoke provided with an arm, and means for attaching the arm to one of the vehicle springs.

The invention has for a further general object to produce an emergency truck for motor vehicles which is simple in its construction, light in weight, and provides efficient and reliable means for supporting the vehicle for movement from place to place in the garage or when the machine breaks down on the road.

With the above and other objects in view, my invention consists in the novel features of construction, combination, and arrangement of parts to be hereinafter more fully described, claimed, and illustrated in the accompanying drawing, in which, Figure 1 is a side elevation of a motor vehicle showing my improved emergency truck applied to the front axle thereof; Fig. 2 is a front elevation, partly in section; and Fig. 3 is a section taken on the line 3—3 of Fig. 1.

Referring in detail to the drawing, 5 designates the two body sections of the truck which are of similar form and are provided with reduced interfitting end portions 6 each having a series of openings to receive the adjusting bolts 7. The other end of each body section of the truck is formed with spaced arms 8. To the arms 8, the spaced bars 9 of a frame are rigidly connected. These spaced bars extend laterally from the body of the truck and in convergent relation to each other, such converging end portions of the bars being upwardly curved and integrally connected to each other, as at 10. The upper arm 9 of the frame is provided with a substantially V-shaped seat 11 in its upper face to receive the axle of the vehicle, indicated at A. It will be understood that each of the arms 9 is provided with a laterally extending lug which is rigidly connected to one of the arms 8 of the truck body by a bolt 12.

The arms of the wheel yoke 13 are connected by the axle, indicated at 14, upon which the supporting wheel 15 is revolubly mounted. The intermediate portion of this yoke, above the wheel 15, is adapted to be disposed between the spaced frame bars 9, and is provided with a vertical bolt receiving opening 16 therein, through which the pivot bolt 17 is loosely disposed. The opposite ends of this bolt are suitably secured in the frame bars. To the intermediate portion of the yoke, the forwardly projecting arms 18 are secured and connected by the transversely extending steering rod 19. To one of the yoke members, a rearwardly projecting arm 20 is also secured, to which a suitable steering gear is connected in the usual manner, whereby the truck wheels 15 may be simultaneously turned to guide or steer the machine. Each of the truck frames is provided at the integrally connected ends of the frame bars 9, with a U-shaped clip 21 which embraces the vehicle spring at its forward end, the arms of said clip receiving the clamping bolt 22 whereby the clip may be securely clamped against the opposite edges of the spring.

In the practical use of my invention, the same is applied in the manner illustrated in Figs. 1 and 2 of the drawing. The body sections 5 of the truck are first adjusted in accordance with the width of the machine. Assuming that the wheels have been so badly damaged that they will not sustain the weight of the machine, the machine body is jacked up and the emergency truck arranged beneath the axle, said axle being engaged in the seats 11 provided therefor in the truck frame bars 9. The forward ends of the truck frames are then securely attached by means of the clamps 21 to the vehicle springs and after making the connection between the steering gear and the arm 20, the machine may be driven under its own power, assuming, of course, that the rear driving axle and wheels of the machine have received no serious injury. When the rear axle is broken, the truck may, of course, be arranged in a similar manner to support the machine body, but in such event, the machine must be towed and cannot, of course, be driven under its own power.

From the foregoing description, taken in connection with the accompanying drawing, it is believed that the construction, manner of use, and several advantages of my invention will be clearly and fully understood. The emergency truck is extremely strong and durable, as well as simple in its construction and, owing to the few parts employed, is light in weight so that it may be carried in the body of the vehicle. The machine is, however, also well adapted for use in garages in moving the machines from place to place. When used by individual owners for emergency purposes, it will be appreciated that the expense incident to procuring assistance in hauling the machine, may be obviated to a large extent. The truck will, of course, be constructed in various sizes, in accordance with the maximum weight it is intended to sustain. The invention is also susceptible of considerable modification in the several structural features thereof, and I, therefore, reserve the privilege of resorting to all such legitimate changes as may be fairly embodied within the spirit and scope of the invention as claimed.

Having thus fully described my invention, what I desire to claim and secure by Letters Patent is:—

1. An emergency truck of the character described including a body, frames rigidly connected to said body, wheel carrying yokes pivotally mounted upon said frames, wheels carried by said yokes, each of said frames being provided with an axle seat, and means for detachably securing the frames to the springs of a vehicle.

2. An emergency truck of the character described including a body, frames rigidly connected to said body, wheel carrying yokes pivotally mounted on said frames, a connecting rod between said yokes, each of said frames being provided with an axle seat, and clamping means carried by each frame for detachably connecting the frames to the springs of a vehicle.

3. An emergency truck of the character described including adjustable body sections each provided with spaced arms at one end, a frame rigidly connected to said arms, wheel carrying yokes pivotally mounted on said frames, wheels carried by said yokes, said frames being adapted to extend beneath and support the vehicle axle, and clamping means carried by each frame to detachably secure said frames to the springs of the vehicle.

4. An emergency truck for vehicles including longitudinally adjustable body sections and means for securing said sections in adjusted relation to each other, a frame rigidly connected to the outer end of each body section, said frame consisting of spaced bars integrally connected together at one of their ends, a wheel carrying yoke pivotally mounted between the spaced bars of each frame, wheels carried by said yoke, the upper bar of each frame having an axle receiving seat formed therein, and clamping devices on the integrally connected ends of the frame bars to detachably secure the frames to the springs of a vehicle.

In testimony whereof I hereunto affix my signature in the presence of two witnesses.

THOMAS J. BALMER.

Witnesses:
 SUSAN B. KEEFE,
 MABEL ENGSTROM.